(12) United States Patent
Tanaka

(10) Patent No.: US 7,092,415 B2
(45) Date of Patent: Aug. 15, 2006

(54) LASER OPTICAL APPARATUS

(75) Inventor: Koichiro Tanaka, Kanagawa (JP)

(73) Assignee: Semiconductor Energy Laboratory Co., Ltd., (JP)

( * ) Notice: Subject to any disclaimer, the term of this patent is extended or adjusted under 35 U.S.C. 154(b) by 16 days.

(21) Appl. No.: 10/830,386

(22) Filed: Apr. 23, 2004

(65) Prior Publication Data

US 2004/0196561 A1    Oct. 7, 2004

Related U.S. Application Data

(60) Continuation of application No. 10/373,522, filed on Feb. 24, 2003, now Pat. No. 6,728,039, which is a continuation of application No. 09/823,043, filed on Mar. 29, 2001, now Pat. No. 6,538,819, which is a division of application No. 09/510,596, filed on Feb. 22, 2000, now Pat. No. 6,212,012, which is a continuation of application No. 09/041,152, filed on Mar. 9, 1998, now Pat. No. 6,239,913.

(30) Foreign Application Priority Data

Mar. 10, 1997   (JP) .................................. 9-072741

(51) Int. Cl.
       *H01S 3/10*       (2006.01)
(52) U.S. Cl. ........................... 372/25; 372/24; 359/619
(58) Field of Classification Search ............ 372/9, 372/24, 25, 28, 29, 33, 69, 101; 359/619
       See application file for complete search history.

(56) References Cited

U.S. PATENT DOCUMENTS

| | | | |
|---|---|---|---|
| 3,667,832 A | 6/1972 | Kitano et al. ............... 359/653 |
| 4,309,225 A | 1/1982 | Fan et al. ..................... 438/72 |
| 4,475,027 A | 10/1984 | Pressley .................. 219/121.6 |
| 4,497,015 A | 1/1985 | Konno et al. ............... 362/268 |
| 4,575,849 A | 3/1986 | Chun ............................. 372/9 |
| 4,605,282 A | 8/1986 | Fox .............................. 359/626 |
| 4,682,885 A | 7/1987 | Torigoe ......................... 355/67 |
| 4,733,944 A | 3/1988 | Fahlen et al. ............... 359/624 |
| 4,735,478 A | 4/1988 | Hily et al. .................... 385/47 |
| 4,769,750 A | 9/1988 | Matsumoto et al. ....... 362/268 |
| 4,930,051 A | 5/1990 | Golz ........................... 362/522 |
| 5,097,291 A | 3/1992 | Suzuki ......................... 355/69 |
| 5,263,250 A | 11/1993 | Nishiwaki et al. ......... 29/890.1 |

(Continued)

FOREIGN PATENT DOCUMENTS

EP      0 391 195      10/1990

(Continued)

OTHER PUBLICATIONS

Pennington et al.; "CCD Imaging Array Combining Fly's-Eye Lens with TDI for Increased Light-Gathering Ability"; IBM Technical Disclosure Bulletin, vol. 21(2); pp. 857-858; 1978.

(Continued)

*Primary Examiner*—Wilson Lee
*Assistant Examiner*—Jimmy Vu
(74) *Attorney, Agent, or Firm*—Fish & Richardson P.C.

(57) ABSTRACT

There is provided a structure for reducing optical loss in an optical apparatus (homogenizer) for making the intensity distribution of a laser beam uniform.

In a multi-cylindrical lens (a glass substrate having a multiplicity of cylindrical lenses formed thereon) used in a homogenizer, convex cylindrical lenses and concave cylindrical lenses are arranged alternately, and the boundaries between the cylindrical lenses have a smooth structure. This makes it possible to reduce scattering of beams that has occurred at the boundaries between the cylindrical lenses.

21 Claims, 3 Drawing Sheets

U.S. PATENT DOCUMENTS

| | | | |
|---|---|---|---|
| 5,307,207 A | 4/1994 | Ichihara | 359/622 |
| 5,529,951 A | 6/1996 | Noguchi et al. | 438/487 |
| 5,561,081 A | 10/1996 | Takenouchi et al. | 438/166 |
| 5,620,246 A | 4/1997 | Uehan | 362/518 |
| 5,775,799 A | 7/1998 | Forkner | 362/268 |
| 5,805,340 A | 9/1998 | Kelly | 359/514 |
| 5,815,494 A * | 9/1998 | Yamazaki et al. | 372/25 |
| 5,858,473 A | 1/1999 | Yamazaki et al. | 427/554 |
| 5,897,799 A | 4/1999 | Yamazaki et al. | 219/121.75 |
| 5,900,980 A | 5/1999 | Yamazaki et al. | 359/619 |
| 5,959,779 A | 9/1999 | Yamazaki et al. | 359/624 |
| 5,968,383 A | 10/1999 | Yamazaki et al. | 219/121.75 |
| 6,002,101 A | 12/1999 | Yamazaki et al. | 219/121.75 |
| 6,002,523 A | 12/1999 | Tanaka | 359/624 |
| 6,038,075 A | 3/2000 | Yamazaki et al. | 359/626 |
| 6,115,181 A | 9/2000 | Kelly | 359/618 |
| 6,159,777 A | 12/2000 | Takenouchi et al. | 438/149 |
| 6,212,012 B1 | 4/2001 | Tanaka | 359/624 |
| 6,239,913 B1 | 5/2001 | Tanaka | 359/619 |
| 6,373,870 B1 * | 4/2002 | Yamazaki et al. | 372/25 |
| 6,538,819 B1 | 3/2003 | Tanaka | 359/619 |
| 6,563,843 B1 * | 5/2003 | Tanaka | 372/9 |

FOREIGN PATENT DOCUMENTS

| | | |
|---|---|---|
| JP | 60-232552 | 11/1985 |
| JP | 61-156218 | 7/1986 |
| JP | 62-080617 | 4/1987 |
| JP | 03-020902 | 1/1991 |
| JP | 05-127081 | 5/1993 |
| JP | 06-027455 | 2/1994 |
| JP | 07-051878 | 2/1995 |
| JP | 07-161202 | 6/1995 |
| JP | 07-041814 | 7/1995 |
| JP | 08-304732 | 11/1996 |
| JP | 09-061601 | 3/1997 |
| JP | 10253916 | 9/1997 |
| WO | WO96-016294 | 5/1996 |

OTHER PUBLICATIONS

Turner et al.; "Gas Immersion Laser Diffusion for Efficient Cell Fabricating and Grain Boundary Research"; 16th IEEE Photovoltaic Specialist Conference; pp. 775-780; San Diego, CA 1982.

Japan 60-232552—English Abstract and family to U.S. Patent No. 4,682,885 (Desig. ID "AB").

Japan 61-156218—English Abstract.

Japan 62-080617—English Abstract.

Japan 03-020902—English Abstract and family to U.S. Patent No. 4,930,051 (Desig. ID "AC") and EP Patent Application No. 0 391 195 (Desig. ID "AE").

Japan 05-127081—English Abstract.

Japan 06-027455—English Abstract.

Japan 07-041814—English Abstract.

Japan 07-051878—English Abstract.

Japan 07-161202—English Abstract and family to U.S. Patent No. 5,620,246 (Desig. ID "AD").

Japan 08-304732—English Abstract.

Japan 09-061601—English Abstract.

* cited by examiner

LASER OPTICAL APPARATUS

CROSS-REFERENCE TO RELATED APPLICATIONS

This application is a continuation of U.S. application Ser. No. 10/373,522, filed on Feb. 24, 2003,(now U.S. Pat. No. 6,728,039), which is a continuation of U.S. application Ser. No. 09/823,043, filed on Mar. 29, 2001 (now U.S. Pat. No. 6,538,819), which is a divisional of U.S. application Ser. No. 09/510,596, filed on Feb. 22, 2000 (now U.S. Pat. No. 6,212,012), which is a continuation of U.S. application Ser. No. 09/041,152, filed on Mar. 9, 1998 (now U.S. Pat. No. 6,239,913), which claims the benefit of a foreign priority application filed in Japan on Mar. 10, 1997, as Japan Application No. 09-072741. This application claims priority to all of these applications, and all of these applications are incorporated by reference.

BACKGROUND OF THE INVENTION

1. Field of the Invention

The invention disclosed in this specification relates to optical apparatuses utilizing a laser such as apparatuses for performing an annealing process by means of irradiation with laser beams (laser annealing apparatuses) and, more particularly, to an laser annealing apparatus projecting beams with a large area which is capable of providing an uniform effect of irradiation. Such a laser annealing apparatus is used in semiconductor manufacturing steps and the like.

Laser beams with a large area are used in apparatuses including exposure apparatuses for forming fine circuit patterns such as semiconductor circuits. Especially, ultraviolet laser beams are used for forming circuits with design rules on a sub-micron basis.

2. Description of the Related Art

A techniques for crystallizing amorphous silicon films by irradiating them with laser beams has been known. Another known laser irradiation technique is to irradiate silicon films with laser beams in order to recover them from damage to crystallinity thereof due to the implantation of impurity ions and in order to activate the implanted impurity ions. Such techniques are referred to as "laser annealing techniques".

A typical example of the latter technique is the annealing of the source and drain regions of a thin film transistor. Those regions are annealed by irradiating them with laser beams after ions of impurities, typically phosphorus or boron, are implanted into those regions.

Such a process of irradiation with laser beams is characterized by the fact that there is substantially no thermal damage to a substrate.

The feature of giving no thermal damage to a substrate reduces limitations on the materials to be subjected to such a process and is advantageous, for example, in forming a semiconductor device on a substrate made of glass or the like which has low heat resistance. This feature is especially important in the fabrication of active matrix liquid crystal displays which recently have an increasing range of application.

For an active matrix liquid crystal display, it is desirable to use a glass substrate from the viewpoint of cost and the requirement for a larger surface area.

A glass substrate can not withstand a heating process at temperatures as high as 600° C. or more or 700° C. or more. An effective technique for avoiding this problem is to perform annealing after the crystallization of a silicon film and the implantation of impurity ions as described above by irradiating it with laser beams.

Even when a glass substrate is used, a method employing irradiation with laser beams results in substantially no damage to the glass substrate. It is therefore possible to use a glass substrate in fabricating a thin film transistor having a crystalline silicon film.

There has been another proposal to use laser beams as a light source for forming fine circuit patterns taking advantage of the fact that laser beams are coherent light. Especially, the use of an ultrasonic laser makes it possible to obtain fine patterns having sizes in sub-microns or smaller.

However, since laser beams have small beam areas when they are generated by a laser apparatus (hereinafter they are referred to as "source beams"), it is common to process a large surface area by scanning laser beams across it. This results in problems including low uniformity of the effect of the process in a surface and a long period of time required for the process. Especially, common source beams result in a significant problem from the viewpoint of uniformity of the effect of processing when used as they are because they have non-uniform distribution of light intensity.

Under such circumstances, a technique has been proposed wherein source beams are processed into beams having highest possible uniformity and the beam size is changed in accordance with the shape of the surface area to be processed and the like. Common beam shape is rectangular or linear shape. Such an arrangement makes it possible to perform uniform laser annealing over a large surface area.

FIG. 1A shows an example of a laser irradiation apparatus in which source beams are processed. For example, an excimer laser is used as the laser oscillator. Laser beams are oscillated by decomposing predetermined gases by means of RF discharge to produce an excited state referred to as "excimer state".

For example, in a KrF excimer laser, an excited state KrF* is obtained by high voltage discharge using Kr and F as raw material gases. While this excited state is unstable as indicated by its duration in the range from several nano-seconds to several micro-seconds, KrF in the ground state is more unstable. This results in inverted population wherein the density in the excited state is higher than the density in the ground state. As a result, induced radiation occurs, which makes it possible to obtain laser beams having relatively high efficiency.

The laser oscillator is not limited to an excimer laser, and other pulse lasers or continuous lasers may be used. In general, pulse lasers are appropriate for the purpose of achieving a high energy density.

As shown in FIG. 1A, a source beam emitted by the laser oscillator is processed into an appropriate size by a beam expander formed by a concave lens or a convex lens.

The beam then enters an optical device referred to as "homogenizer" which includes at least one lens device (multi-cylindrical lens) having a multiplicity of cylindrical lenses (generally in a parabolic configuration). As shown in FIG. 1B, a conventional multi-cylindrical lens includes a plurality of cylindrical lenses 1 through 5 (which are all convex lenses) formed on a single sheet of glass.

In general, two multi-cylindrical lenses are used and arranged so that they are perpendicular to each other. Obviously, the number of the multi-cylindrical lens may be one or three or more. When one multi-cylindrical lens is used, the non-uniformity of a source beam in one direction is dispersed. When two or more multi-cylindrical lenses are formed in the same direction, the same effect as increasing the number of the cylindrical lenses can be achieved.

When a beam passes through the multi-cylindrical lens, the beam can be converted into a uniform beam having a distributed energy density. The principle behind this will be described later. Thereafter, the beam is processed by a converging lens into a desired shape or, if needed, deflected by a mirror to be projected upon a sample (see FIG. 1A).

A description will now be made on the principle of a conventional homogenizer (multi-cylindrical lens) and a problem of the same which is the problem to be solved by the invention. In order to avoid complication, discussion on an optical basis will be focused on only one surface. Laser beams that have passed through a multi-cylindrical lens are as shown in FIG. 2A.

Here, the multi-cylindrical lens L includes five convex cylindrical lenses 1, and the beam incident upon each of the cylindrical lenses is refracted by the cylindrical lens. After being converged at a focal point, the beams are diffused. This process results in a region in which all of the beams that pass through the respective cylindrical lenses are mixed (mixed region).

Let us assume here that the distribution of the optical intensity of the beams is polarized, resulting in differences in the intensity of the beams incident upon the respective cylindrical lenses. In the mixed region, however, such polarization is scattered because the beams that pass through the respective cylindrical lenses are mixed. That is, the optical intensity is made uniform. It is thus possible to obtain beams having less distribution of optical intensity (see FIG. 2A).

When we look at the paths of the beams that pass through the multi-cylindrical lens, the beams can be regarded as beams emitted from point light sources F (i.e., focal points) arranged at equal intervals (distances "a") (see FIG. 2B).

The same effect can be achieved by providing a convex cylindrical lens $1_1$ on one side of a glass substrate and a convex cylindrical lens $1_2$ on the other side at an interval "a". In FIG. 3A, the path of a beam that has passed through the cylindrical lens $1_1$ is indicated by the solid line, and the path of a beam that has passed through the cylindrical lens $1_2$ is indicated by the broken line. In this case, a mixed region is obtained as in the case shown in FIG. 2A (see FIG. 3A).

When we look at the paths of the beams that pass through the multi-cylindrical lens, as shown in FIG. 3B, the beams can be regarded as beams emitted from two kinds of point light sources $F_1$ and $F_2$ (i.e., focal points) (see FIG. 3B).

In the case of the conventional multi-cylindrical lens as described above, since there is an angle at the ends of each cylindrical lens (boundaries between itself and other cylindrical lenses), beams have been scattered at such regions, which has resulted in optical loss. This means that the laser beams can not be effectively utilized and the beam intensity is reduced.

SUMMARY OF THE INVENTION

The present invention has been conceived taking the above-described problem into consideration. A multi-cylindrical lens according to the present invention is characterized in that not only convex cylindrical lenses but also concave cylindrical lenses are used; the convex cylindrical lenses and concave cylindrical lenses are alternately arranged; and the cylindrical lenses smoothly continue to each other.

According to a first aspect of the invention, a multi-cylindrical lens having the above-described configuration is provided in a homogenizer which is inserted and used between a laser oscillator and an object to be irradiated in an apparatus for forming a laser beam having a linear or rectangular beam shape.

According to a second aspect of the invention, in a laser optical apparatus having a laser oscillator and a homogenizer to which a laser beam emitted by the laser oscillator is input, a multi-cylindrical lens used in the homogenizer have the above-described configuration.

In the above-described multi-cylindrical lens, the state of the curved surface of the convex cylindrical lenses may be the same as the state of the curved surface of the concave cylindrical lenses. Further, at least two multi-cylindrical lenses may be provided in the homogenizer, and the two multi-cylindrical lenses may be provided in directions perpendicular to each other.

The configuration of a multi-cylindrical lens according to the invention is as shown in FIG. 1C. Specifically, while any conventional multi-cylindrical lens has been formed by convex cylindrical lenses 1 through 5 (see FIG. 1B), concave cylindrical lenses 2 and 4 are provided between the convex cylindrical lenses 1 and 3 and between the convex cylindrical lenses 3 and 5, respectively, and the boundaries between those cylindrical lenses are smooth and continuous (see FIG. 1C).

The cylindrical lenses can be smoothly connected to each other by making the curvature (the shape of the curved surface) of a concave cylindrical lens identical to a convex cylindrical lens adjacent thereto. When the cylindrical lenses are parabolic lenses, there is provided a structure which is a combination of parabolic surfaces having different orientations. The paths of laser beams in such a multi-cylindrical lens are as shown in FIGS. 4A and 4B when illustrated in the same manner as in FIGS. 2A and 2B and FIGS. 3A and 3B.

Here, the multi-cylindrical lens L includes three convex cylindrical lenses $1_1$ and two concave cylindrical lenses $1_2$ as shown in FIG. 1C. Beams incident upon the convex cylindrical lenses are diffused after being converged at focal points. On the other hand, beams incident upon the concave cylindrical lenses are simply diffused as if they are diffused from certain points. As a result, there is obtained a region where all of the beams that pass through the cylindrical lenses are mixed (mixed region).

The above-described effect can be similarly achieved even when the convex cylindrical lenses and the concave cylindrical lenses have different curvatures (a factor that determines a focal distance or the shape of the curved surface of a lens). In addition, optical loss can be reduced in a multi-cylindrical lens having such a configuration because there is no structure that scatters beams (an unsmooth region such as a protrusion) (see FIG. 4A).

When we look at the paths of the beams that pass through the multi-cylindrical lens, the beams can be regarded as beams emitted from two kinds of point light sources $F_1$ and $F_2$ (i.e., focal points) as those shown in FIG. 3B (see FIG. 4B).

When the convex cylindrical lenses and the concave cylindrical lenses have the same curvature, the boundaries of the paths of the beams that pass through the concave cylindrical lenses pass through the focal points $F_1$ of the adjacent convex cylindrical lenses. A description follows on this point. When convex cylindrical lenses and the concave cylindrical lenses have the same curvature, the angle of convergence by the former (the angle at which the beams are diffused after passing through the focal points) is the same as the angle of diffusion by the latter when collimated beams are incident.

Specifically, when the focal distance of a convex cylindrical lens $1_1$ is represented by x as shown in FIG. 5A, collimated beams that pass through a concave cylindrical lens $1_2$ can be regarded as beams emitted from a point $F_2$ which is at the distance x toward the side at which the beams enter. Let us consider the path $F_1A$ of a beam that passes through the lower end of the convex cylindrical lens $1_1$ and the path $F_2A$ of a beam that passes through the upper end of the concave cylindrical lens $1_2$. Then, since the angles of diffusion and convergence of the beams that pass through those lenses are the same, the line $F_2A$ overlaps the line $F_1A$. That is, the boundary of the path of the beam passing through the concave cylindrical lens passes through the focal point $F_1$ of the convex cylindrical lens adjacent thereto (FIG. 5B).

DETAILED DESCRIPTION OF PREFERRED EMBODIMENT

Figure 1A:
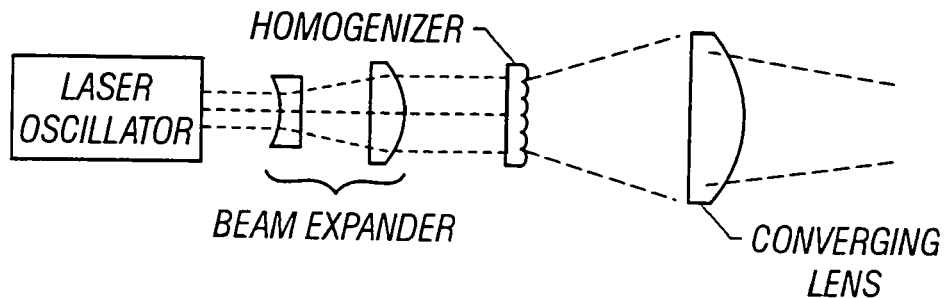
FIG. 1A is a schematic view of an optical system of a laser irradiation apparatus.
Figure 1B:
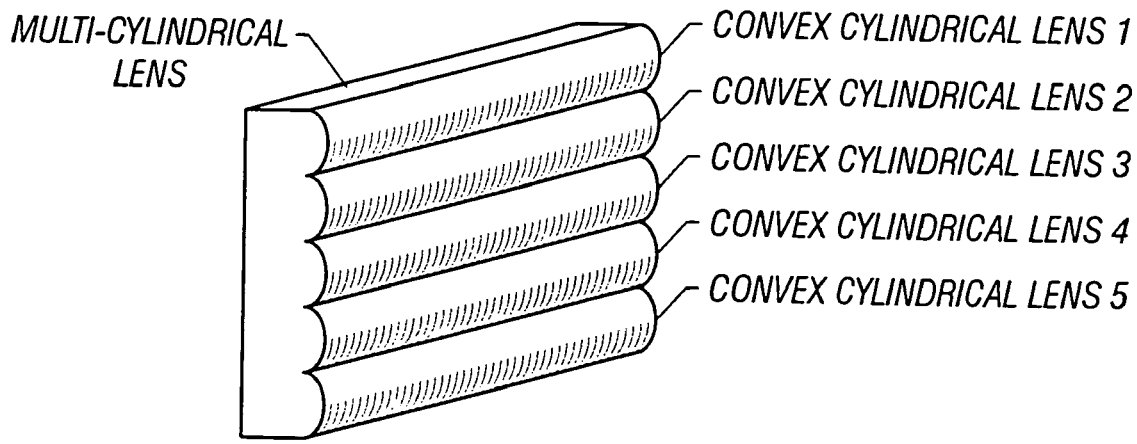
FIG. 1B is a schematic view of a conventional multi-cylindrical lens.
Figure 1C:
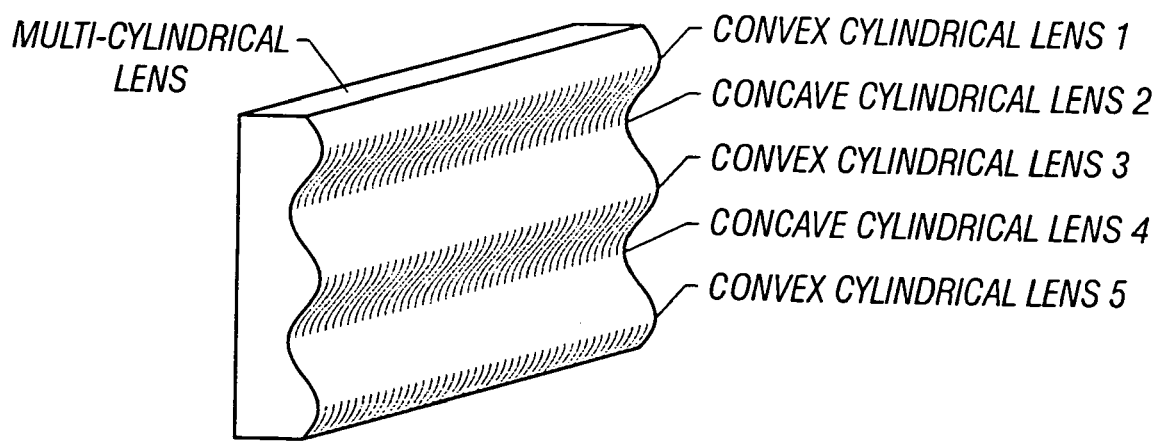
FIG. 1C is a schematic view of a multi-cylindrical lens according to the present invention.
Figure 2A:
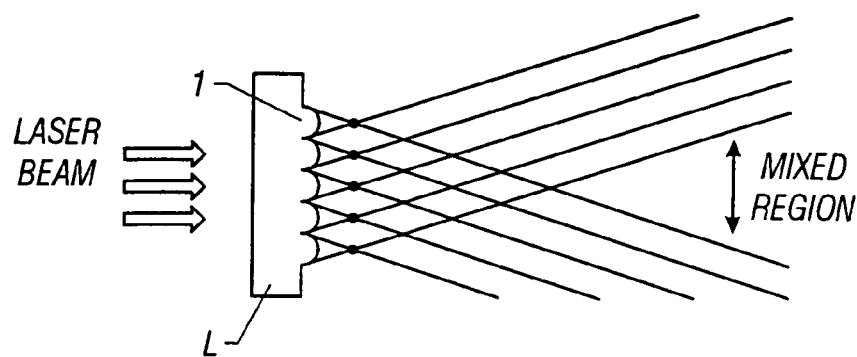
FIGS. 2A and 2B are schematic views showing beam paths in a conventional multi-cylindrical lens.
Figure 2B:
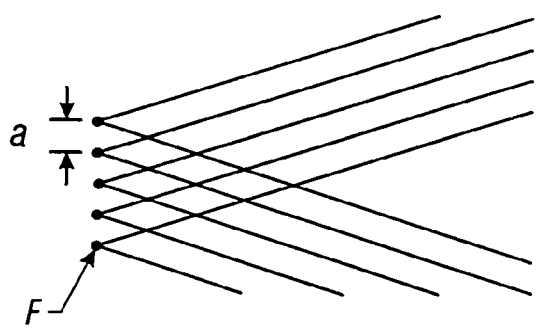
Figure 3A:
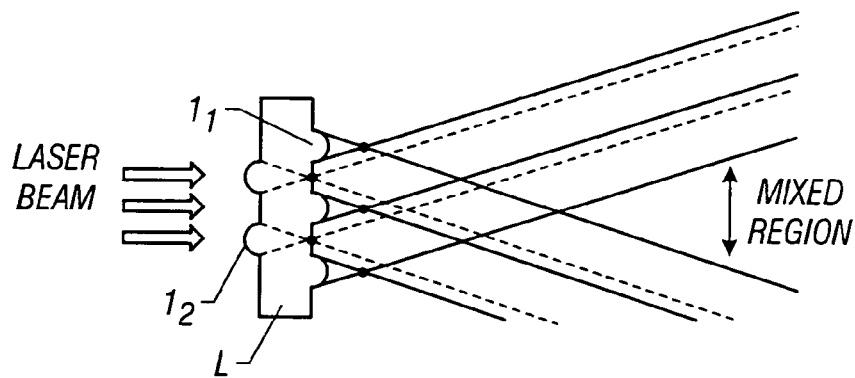
FIGS. 3A and 3B are schematic views showing beam paths in a conventional multi-cylindrical lens.
Figure 3B:
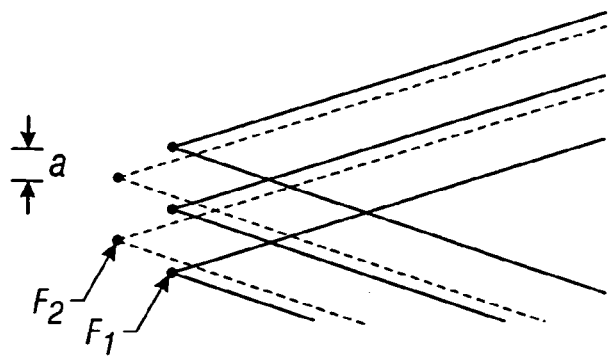
Figure 4A:
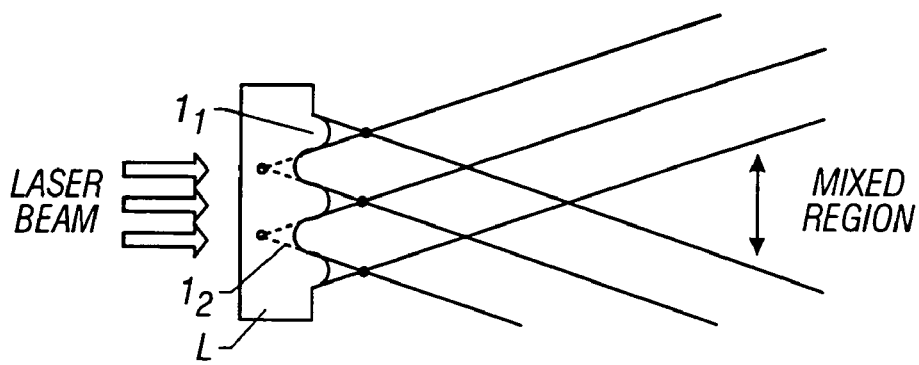
FIGS. 4A and 4B are schematic views showing beam paths in a multi-cylindrical lens according to the present invention.
Figure 4B:
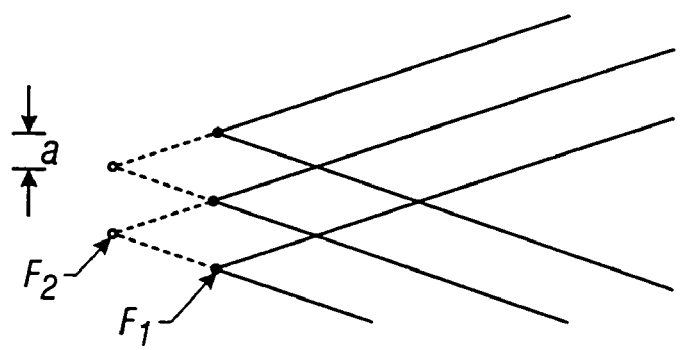
Figure 5A:
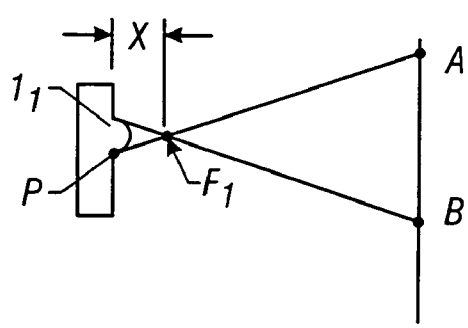
FIGS. 5A and 5B are views showing beam paths of convex lenses and concave lenses.
Figure 5B:
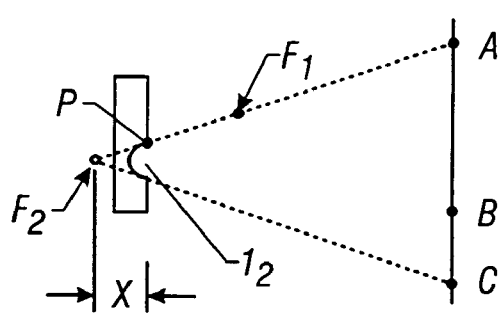

An optical system of an embodiment of the present invention will now be described. A laser irradiation apparatus according to the present embodiment has the same basic configuration as that shown in FIG. 1A. The shape of a laser beam before incidence upon a homogenizer is expressed by 6 cm×5 cm. In this embodiment, a multi-cylindrical lens is used as the homogenizer. Here, only the multi-cylindrical lens will be described.

In the configuration shown in this embodiment, the multi-cylindrical lens is formed by arranging six concave cylindrical lenses (having a width of 5 mm) and five convex cylindrical lenses (having a width of 5 mm) alternately to divide an incident beam into about ten beams. The length of the cylindrical lenses in the longitudinal direction thereof is 7 cm. The multi-cylindrical lens is made of quartz.

In the present embodiment, the length of a liner laser beam that is finally projected is 12 cm in the longitudinal direction thereof and the width is 0.5 mm. As a result, the laser beam is enlarged by a factor of 2 in the longitudinal direction and is reduced by a factor of 100 in the direction perpendicular thereto after the laser beam passes through the homogenizer. All of the convex cylindrical lenses and concave cylindrical lenses are spherical lenses and have the same curvature. The focal distance of the convex cylindrical lenses is 5 cm (see FIG. 1A).

The use of the invention disclosed in this specification makes it possible to obtain a uniform laser beam having a large area required in a laser process used for the fabrication of a semiconductor device and the like.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A laser system:
a laser oscillator for producing a laser beam;
a homogenizer provided between the laser oscillator and an object to be irradiated, the homogenizer comprising at least one multi-cylindrical lens; and
a beam expander provided between the laser oscillator and the homogenizer, the beam expander comprising at least one lens,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the at least one lens has a concave surface opposed to the laser oscillator.

2. The laser system according to claim 1, wherein the laser beam has a linear beam shape on the object to be irradiated.

3. The laser system according to claim 1, wherein the laser beam has a rectangular beam shape on the object to be irradiated.

4. A laser system:
a laser oscillator for producing a laser beam;
a homogenizer provided between the laser oscillator and an object to be irradiated, the homogenizer comprising at least one multi-cylindrical lens; and
a beam expander provided between the laser oscillator and the homogenizer, the beam expander comprising at least one lens,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the at least one lens has a convex surface opposed to the homogenizer.

5. The laser system according to claim 4, wherein the laser beam has a linear beam shape on the object to be irradiated.

6. The laser system according to claim 4, wherein the laser beam has a rectangular beam shape on the object to be irradiated.

7. A laser system:
a laser oscillator for producing a laser beam;
a homogenizer provided between the laser oscillator and an object to be irradiated, the homogenizer comprising at least one multi-cylindrical lens; and
a beam expander provided between the laser oscillator and the homogenizer, the beam expander comprising a first lens and a second lens,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and wherein the first lens has a concave surface opposed to the laser oscillator and the second lens has a convex surface opposed to the homogenizer.

8. The laser system according to claim 7, wherein the laser beam has a linear beam shape on the object to be irradiated.

9. The laser system according to claim 7, wherein the laser beam has a rectangular beam shape on the object to be irradiated.

10. A laser system:
a laser oscillator for producing a laser beam;
a homogenizer provided between the laser oscillator and an object to be irradiated, the homogenizer comprising at least one multi-cylindrical lens; and
a beam expander provided between the laser oscillator and the homogenizer, the beam expander comprising a first lens provided between the laser oscillator and the homogenizer and a second lens provided between the first lens and the homogenizer,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the first lens has a concave surface opposed to the laser oscillator and the second lens has a convex surface opposed to the homogenizer.

11. The laser system according to claim 10, wherein the laser beam has a linear beam shape on the object to be irradiated.

12. The laser system according to claim 10, wherein the laser beam has a rectangular beam shape on the object to be irradiated.

13. A laser system:
a laser oscillator for producing a laser beam;
a homogenizer provided between the laser oscillator and an object to be irradiated, the homogenizer comprising at least one multi-cylindrical lens;
a beam expander provided between the laser oscillator and the homogenizer, the beam expander comprising a first lens and a second lens; and
at least one conversing lens provided between the homogenized and the object to be irradiated,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the first lens has a concave surface opposed to the laser oscillator and the second lens has a convex surface opposed to the homogenizer.

14. The laser system according to claim 13, wherein the laser beam has a linear beam shape on the object to be irradiated.

15. The laser system according to claim 13, wherein the laser beam has a rectangular beam shape on the object to be irradiated.

16. A laser system:
a pulse laser;
a homogenizer provided between the pulse laser and an object to be irradiated, the homogenizer comprising at least one multi-cylindrical lens; and
a beam expander provided between the pulse laser and the homogenizer, the beam expander comprising a first lens and a second lens,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the first lens has a concave surface opposed to the pulse laser and the second lens has a convex surface opposed to the homogenizer.

17. The laser system according to claim 16, wherein the pulse laser has a linear beam shape on the object to be irradiated.

18. The laser system according to claim 16, wherein the pulse laser has a rectangular beam shape on the object to be irradiated.

19. A laser system:
a continuous laser;
a homogenizer provided between the continuous laser and an object to be irradiated, the homogenizer comprising at least one multi-cylindrical lens; and
a beam expander provided between the continuous laser and the homogenizer, the beam expander comprising a first lens and a second lens,
wherein the at least one multi-cylindrical lens comprises a plurality of convex cylindrical lenses and concave cylindrical lenses arranged alternately,
wherein a convex surface of one of the convex cylindrical lenses and a concave surface of one of the concave cylindrical lenses adjacent to each other are smoothly continuous without having an angle therebetween, and
wherein the first lens has a concave surface opposed to the continuous laser and the second lens has a convex surface opposed to the homogenizer.

20. The laser system according to claim 19, wherein the continuous laser has a linear beam shape on the object to be irradiated.

21. The laser system according to claim 19, wherein the continuous laser has a rectangular beam shape on the object to be irradiated.

* * * * *